US012715753B2

(12) United States Patent
Shin et al.

(10) Patent No.: US 12,715,753 B2
(45) Date of Patent: Aug. 25, 2026

(54) WATER PURIFIER CONTROL METHOD AND MODULE, AND WATER PURIFIER SYSTEM USING SAME

(71) Applicant: MOBILINT INC., Seoul (KR)

(72) Inventors: Dongjoo Shin, Guri-si (KR); Kanybek Asanbekov, Seoul (KR); Jisung Kim, Seoul (KR)

(73) Assignee: MOBILINT INC., Seoul (KR)

( * ) Notice: Subject to any disclaimer, the term of this patent is extended or adjusted under 35 U.S.C. 154(b) by 493 days.

(21) Appl. No.: 18/336,756

(22) Filed: Jun. 16, 2023

(65) Prior Publication Data

US 2023/0331539 A1 Oct. 19, 2023

Related U.S. Application Data

(63) Continuation of application No. PCT/KR2020/018843, filed on Dec. 22, 2020.

(30) Foreign Application Priority Data

Dec. 22, 2020 (KR) ........................ 10-2020-0180373

(51) Int. Cl.

*B67D 1/12* (2006.01)
*B67D 1/08* (2006.01)
*G06V 20/50* (2022.01)
*G06V 40/10* (2022.01)

(52) U.S. Cl.

CPC ......... *B67D 1/1236* (2013.01); *B67D 1/0888* (2013.01); *G06V 20/50* (2022.01); *G06V 40/10* (2022.01); *B67D 2210/0001* (2013.01)

(58) Field of Classification Search

CPC ........ G06V 10/82; G06V 20/50; G06V 40/10; B67D 1/1236; B67D 1/0888; B67D 2210/0001

See application file for complete search history.

(56) References Cited

U.S. PATENT DOCUMENTS 7,637,205 B2 12/2009 Greiwe et al.
8,925,769 B2 1/2015 Zapp et al.
9,533,870 B2 1/2017 Zapp (Continued)

FOREIGN PATENT DOCUMENTS

JP 2005-537195 A 12/2005
JP 2017-159941 A 9/2017

(Continued)

OTHER PUBLICATIONS

International Search Report issued in PCT/KR2020/018843; mailed Sep. 17, 2021.

*Primary Examiner* — Shogo Sasaki
(74) *Attorney, Agent, or Firm* — Studebaker Brackett PLLC

(57) ABSTRACT

The present invention relates to a water purifier control method and module, and a water purifier system using same, which can provide customized services for each of multiple users. The water purifier system according to the present invention can provide user-customized services according to a container (for example, a cup) that a user intends to use, and can provide specific-user-dedicated customized services even though the water purifier system can be used by the multiple users.

12 Claims, 5 Drawing Sheets

(56) References Cited

U.S. PATENT DOCUMENTS

| | | | | |
|---|---|---|---|---|
| 9,821,997 | B2 | 11/2017 | Zapp | |
| 10,031,505 | B2 | 7/2018 | Martindale et al. | |
| 11,158,151 | B2 * | 10/2021 | DiFatta | G07F 9/001 |
| 11,208,315 | B2 * | 12/2021 | Crawford | G07F 13/065 |
| 2004/0210405 | A1 * | 10/2004 | Mogadam | B67D 3/0054 702/50 |
| 2006/0123994 | A1 | 6/2006 | Greiwe et al. | |
| 2009/0277931 | A1 | 11/2009 | Zapp | |
| 2012/0211516 | A1 | 8/2012 | Zapp et al. | |
| 2014/0319167 | A1 * | 10/2014 | Dorney | G06Q 20/342 222/1 |
| 2014/0367411 | A1 | 12/2014 | Zapp | |
| 2015/0191341 | A1 * | 7/2015 | Martindale | B67D 1/0882 345/173 |
| 2016/0363921 | A1 | 12/2016 | Martindale et al. | |
| 2017/0073209 | A1 | 3/2017 | Zapp | |
| 2019/0300357 | A1 * | 10/2019 | Crawford | G07F 13/065 |

FOREIGN PATENT DOCUMENTS

| | | | |
|---|---|---|---|
| JP | 2017-210253 | A | 11/2017 |
| JP | 2018-077742 | A | 5/2018 |
| JP | 2018-520952 | A | 8/2018 |
| KR | 10-2019-0085773 | A | 7/2019 |
| KR | 10-2019-0099161 | A | 8/2019 |

* cited by examiner

FIG. 1

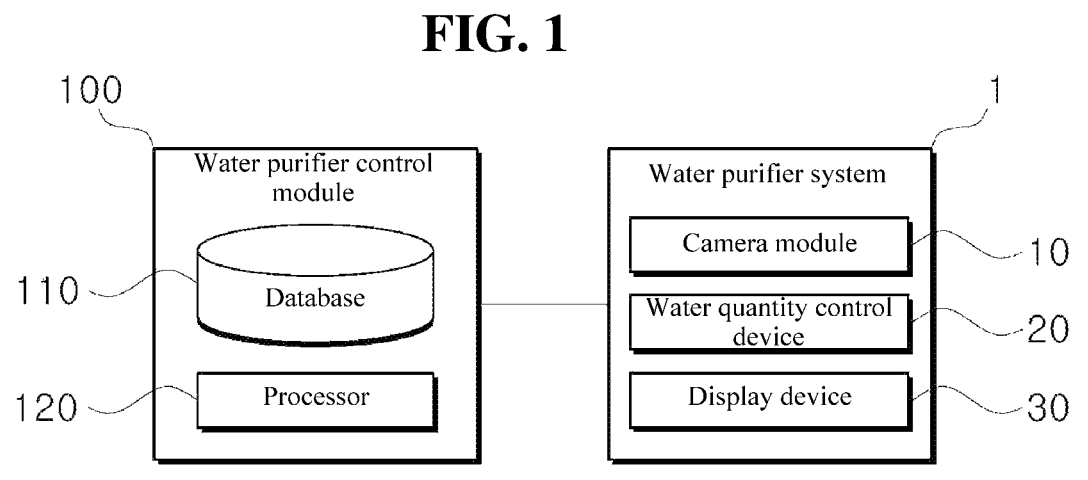

100
Water purifier control module
110 Database
120 Processor

1
Water purifier system
Camera module 10
Water quantity control device 20
Display device 30

WATER PURIFIER CONTROL METHOD AND MODULE, AND WATER PURIFIER SYSTEM USING SAME

CROSS-REFERENCE TO RELATED APPLICATIONS

The present application is a continuation of International Patent Application No. PCT/KR2020/018843, filed on Dec. 22, 2020, which is based upon and claims the benefit of priority to Korean Patent Application No. 10-2020-0180373 filed on Dec. 22, 2020. The disclosures of the above-listed applications are hereby incorporated by reference herein in their entirety.

BACKGROUND

The inventive concept relates to a water purifier control method, a water purifier control module, and a water purifier system using the same.

Water purifiers are widely used in many places such as homes and offices. In general, a water purifier is a device that provides water purified by passing through a certain type of filter, and removes floaters or harmful impurities contained from tap water and provides the water to users.

Recently, water purifiers providing various services are being developed in consideration of various installation environments and user convenience. In particular, a number of water purifiers providing customized services for each user in consideration of user convenience have been proposed. However, the water purifiers can only provide the corresponding services to a small number of persons, but there are many implementation problems in providing customized services for each user when the water purifiers are installed in a place used by many people, such as an office.

SUMMARY

Embodiments of the inventive concept provide a water purifier control method, a water purifier control module, and a water purifier system using the same, capable of providing customized services for each user.

However, problems to be solved by the inventive concept may not be limited to the above-described problems. Although not described herein, other problems to be solved by the inventive concept can be clearly understood by those skilled in the art from the following description.

According to an embodiment, a water purifier control module includes a database that stores water quantity information identified based on a data set including user information and container information and a processor connected to the database to control an operation of a water purifier system, wherein the processor may acquire captured image information from a camera module installed in the water purifier system to capture a user and a container located under a water outlet, acquire user identification information corresponding to the user and container identification information corresponding to the container from the image information, determine whether water quantity information corresponding to an input data set including the acquired user identification information and container identification information is stored in the database, provide the stored water quantity information to the water purifier system when the water quantity information corresponding to the input data set is stored in the database, provide default water quantity information corresponding to the container identification information to the water purifier system when the water quantity information corresponding to the input data set is not stored in the database, receive actual water quantity information from the water purifier system, and update the stored water quantity information in the database with the actual water quantity information or newly store the actual water quantity information as the water quantity information corresponding to the input data set.

The actual water quantity information may be determined based on at least one or more of the water quantity information provided to the water purifier system or the default water quantity information, control input information input from the user, and system control information for performing control to prevent the amount of dispensed water in the container from overflowing the container.

The acquired image information may be acquired from a single camera device installed in the water purifier system to simultaneously capture the user and the container.

The acquired image information may include first image information acquired from a first camera device installed in the water purifier system to capture the user and second image information acquired from a second camera device installed in the water purifier system to capture the container.

The processor may receive preset information from the user, and the input data set may further include the preset information input from the user.

According to an embodiment, a water purifier system includes a database that stores water quantity information identified based on a data set including user information and container information, a camera module installed to capture a user and a container located under a water outlet, a water quantity control device that controls a water quantity, and a processor connected to the database, the camera module, and the water quantity control device to control an operation of the water purifier system including the water quantity control device, wherein the processor may acquire captured image information from the camera module, acquire user identification information corresponding to the user and container identification information corresponding to the container from the image information, determine whether water quantity information corresponding to an input data set including the acquired user identification information and container identification information is stored in the database, control the water quantity control device based on the stored water quantity information when the water quantity information corresponding to the input data set is stored in the database, control the water quantity control device based on default water quantity information corresponding to the container identification information when the water quantity information corresponding to the input data set is not stored in the database, acquire actual water quantity information of the water quantity control device, and update the stored water quantity information in the database with the actual water quantity information or newly store the actual water quantity information as the water quantity information corresponding to the input data set.

The camera module may include a single camera device installed in the water purifier system to simultaneously capture the user and the container. The camera module may include a first camera device installed in the water purifier system to face the user, and a second camera device installed in the water purifier system to have a predetermined angle with a downward direction of the water outlet of the water purifier system.

According to an embodiment, a water purifier control method includes acquiring captured image information from a camera module installed in a water purifier system to capture a user and a container located under a water outlet, acquiring user identification information corresponding to the user and container identification information corresponding to the container from the image information, determining whether water quantity information corresponding to an input data set including the acquired user identification information and container identification information is stored in a database, providing the stored water quantity information to the water purifier system when the water quantity information corresponding to the input data set is stored in the database, providing default water quantity information corresponding to the container identification information to the water purifier system when the water quantity information corresponding to the input data set is not stored in the database, receiving actual water quantity information from the water purifier system, and updating the stored water quantity information in the database with the actual water quantity information or newly storing the actual water quantity information as the water quantity information corresponding to the input data set.

Other specific details of the inventive concept are included in the detailed description and drawings.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 1 is a diagram schematically showing a water purifier control module and a water purifier system connected to the water purifier control module according to the inventive concept;

DETAILED DESCRIPTION

Figure 2:
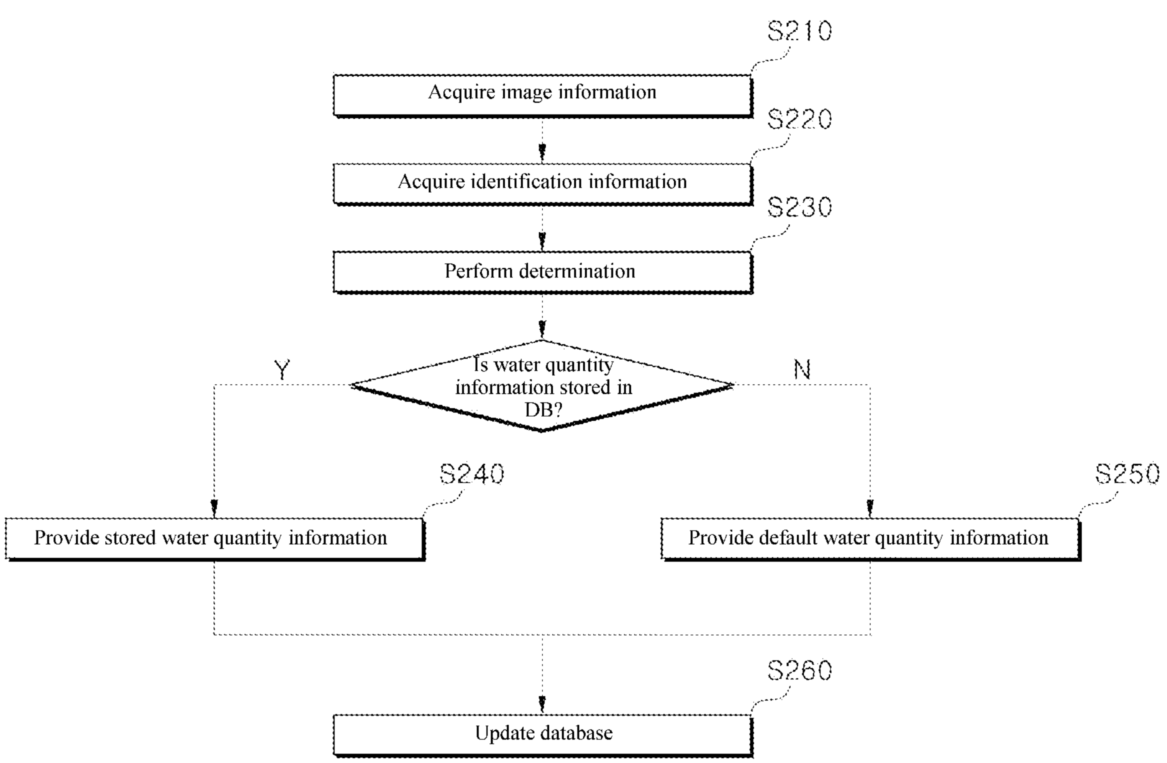
FIG. 2 is a diagram schematically showing a method of operating a water purifier control module according to the inventive concept.

Advantages and features of the inventive concept and methods for achieving them will be apparent with reference to embodiments described below in detail in conjunction with the accompanying drawings. However, the inventive concept is not limited to the embodiments disclosed below, but can be implemented in various forms, and these embodiments are to make the disclosure of the inventive concept complete, and are provided so that this disclosure will be thorough and complete and will fully convey the scope of the invention to those of ordinary skill in the art, which is to be defined only by the scope of the claims.

The terminology used herein is for the purpose of describing particular embodiments only and is not intended to be limiting of the inventive concept. The singular expressions include plural expressions unless the context clearly dictates otherwise. In this specification, the terms "comprises" and/or "comprising" are intended to specify the presence of stated elements, but do not preclude the presence or addition of elements Like reference numerals refer to like elements throughout the specification, and "and/or" includes each and all combinations of one or more of the mentioned elements. Although "first", "second", and the like are used to describe various components, these components are of course not limited by these terms. These terms are only used to distinguish one component from another. Thus, a first element discussed below could be termed a second element without departing from the teachings of the inventive concept.

Unless otherwise defined, all terms (including technical and scientific terms) used herein have the same meaning as commonly understood by one of ordinary skill in the art to which this invention belongs. It will be further understood that terms such as those defined in commonly used dictionaries, will not be interpreted in an idealized or overly formal sense unless expressly so defined herein.

Spatially relative terms, such as "below", "beneath", "lower", "above", and "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. Components may also be oriented in other orientations, and thus spatially relative terms may be interpreted according to orientations.

Hereinafter, embodiments of the inventive concept will be described in detail with reference to the accompanying drawings.

FIG. 1 is a diagram schematically showing a water purifier control module and a water purifier system connected to the water purifier control module according to the inventive concept, and FIG. 2 is a diagram schematically showing a method of operating a water purifier control module according to the inventive concept.

As shown in FIG. 1, according to an embodiment applicable to the inventive concept, a water purifier control module 100 may include a database 110 and a processor 120, and may be electrically/physically connected to a separate water purifier system 1. In this case, the water purifier system 1 may include a camera module 10 and a water quantity control device 20. In other words, the water purifier control module 100 according to the inventive concept may be separate from the water purifier system 1 to control the water purifier system 1.

Figure 5:
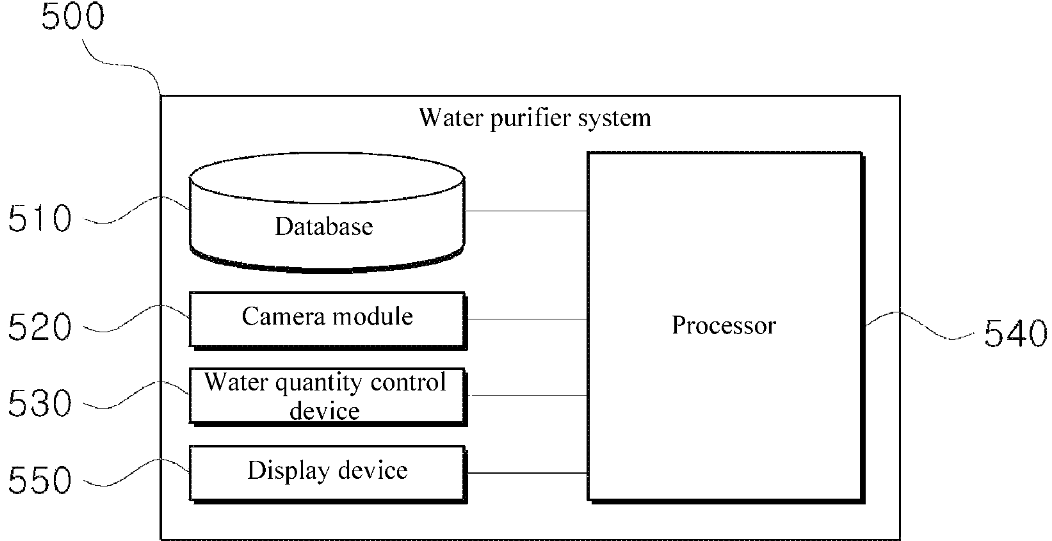
FIG. 5 is a schematic diagram showing a water purifier system according to the inventive concept.

Alternatively, in another embodiment applicable to the inventive concept, the water purifier control module 100 may be included in the water purifier system 1, or conversely, may be configured as an entire system including the water purifier system 1. In this case, the entire system may be configured as shown in FIG. 5. Hereinafter, an operation example of the entire system will be described in detail with reference to FIG. 5.

The database 110 may store water quantity information identified based on a data set including user information and container information. For example, the data set may be composed of a combination of the user information and the container information. Alternatively, as another example, the data set may be composed of a combination of the user information, the container information, and preset information. Alternatively, as still another example, the data set may be composed of a combination of the user information, the container information and other additional information.

The processor 120 may be connected to the database 110 to control the operation of the water purifier system 1 as described below. In the inventive concept, the processor 120 may be configured in various ways, for example, with an application processor (AP), a neural processing unit (NPU) or the like.

In the inventive concept, it is assumed that a user approaches the water purifier system 1 with a container (e.g., cup, bowl, etc.) and places the container under the water outlet of the water purifier system 1. In this case, the processor 120 may acquire image information captured by the camera module 10 installed in the water purifier system 1 to capture the user and the container located under the water outlet (S210). In other words, the processor 120 may receive the image information captured by the camera module 10 from the camera module 10. In this case, the image information may include image information acquired by capturing the user and the container.

Subsequently, the processor 120 may obtain user identification information corresponding to the user and container identification information corresponding to the container from the image information acquired through step S210 (S220).

According to the inventive concept, the processor 120 may obtain the user identification information and the container identification information from the image information acquired through step S210 by applying various image processing methods. For example, the processor 120 may obtain the user identification information and the container identification information by applying the acquired image information as input information of a deep learning algorithm.

For reference, the deep learning algorithm is one of machine learning algorithms and refers to a modeling technique developed from an artificial neural network modeled after the human neural network. An artificial neural network may be configured in a multi-layered structure as shown in FIG. 3.

Figure 3:
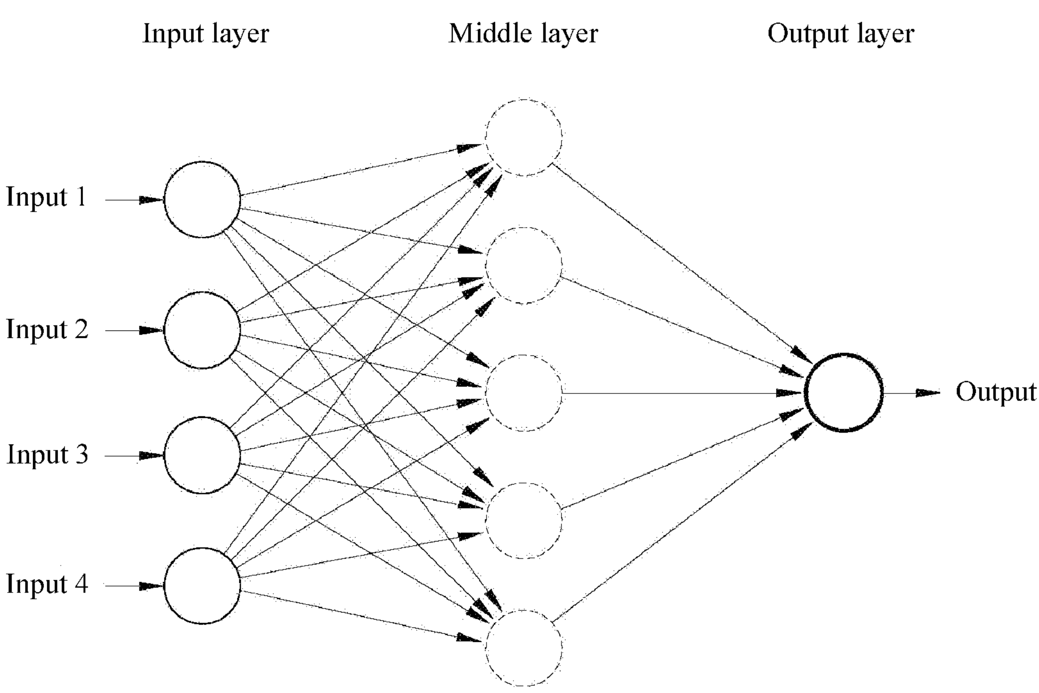
FIG. 3 is a diagram briefly illustrating the basic concept of an artificial neural network.

FIG. 3 is a diagram briefly illustrating the basic concept of an artificial neural network.

As shown in FIG. 3, an artificial neural network (ANN) may have a layered structure including an input layer, an output layer, and at least one intermediate layer (or hidden layer) between the input layer and the output layer. The deep learning algorithm may derive highly reliable results through learning that optimizes weights of activation functions between layers based on such a multi-layered structure.

Deep learning algorithms applicable to the present disclosure may include a deep neural network (DNN), a convolutional neural network (CNN), a recurrent neural network (RNN), and the like.

The DNN is basically characterized by improving learning results by increasing the number of middle layers (or hidden layers) in the existing ANN model. For example, the DNN is characterized by performing a learning process using two or more middle layers. Accordingly, a computer may derive an optimal output value by repeating a process of generating classification labels, distorting space, and classifying data by the computer itself.

The CNN is characterized by having a structure of extracting features of data and figuring out a pattern of the features, unlike existing techniques in which a learning process is performed by extracting knowledge from data. The CNN may be performed through a convolution process and a pooling process. In other words, the CNN may include an algorithm complexly composed of a convolution layer and a pooling layer. Here, a process of extracting features of data (so-called a convolution process) is performed in the convolution layer. The convolution process is a process of examining adjacent components of each component in data to identify characteristics and deriving the identified characteristics as one sheet as a single compression process to effectively reduce the number of parameters. In the pooling layer, a process of reducing the size of the layer that has undergone the convolution process (so-called a pooling process) is performed. The pooling process may reduce the size of data, cancel noise, and provide consistent features in fine parts. For example, the CNN may be used in various fields such as information extraction, sentence classification, and face recognition.

The RNN is a type of artificial neural network specialized in learning repetitive and sequential data and is characterized by having a circular structure therein. The RNN uses the circular structure to apply weights to past learning contents and reflect them to current learning, enabling a connection between current learning and past learning, and has the characteristic of being dependent on time. The RNN is an algorithm that solves the limitations in existing learning of continuous, iterative, and sequential data, and may be used for recognizing a speech waveform or identifying front and rear components of text.

However, these are only examples of specific deep learning techniques applicable to the inventive concept, and other deep learning techniques may be applied to the inventive concept according to embodiments.

The processor 120 may determine whether water quantity information corresponding to an input data set including the user identification information and the container identification information acquired through step S220 is stored in the database 110 (S230).

When the water quantity information corresponding to the input data set is stored in the database 110, the processor 120 may provide the stored water quantity information to the water purifier system 1 (S240). Conversely, when the water quantity information corresponding to the input data set is not stored in the database 110, the processor 120 may provide default water quantity information corresponding to the container identification information acquired through step S220 to the water purifier system 1 (S250). To this end, the database 110 may additionally store default water quantity information for each container identification information.

The water purifier system 1 may control the water quantity control device 20 using the stored water quantity information provided in step S240 or the default water quantity information provided in step S250. Through this, the water purifier system 1 may actually dispense a predetermined amount of purified water into the user's container.

As a specific example, the water purifier system 1 may control the water quantity control device 20 to actually dispense, into the user's container, a predetermined amount of purified water corresponding to the stored water quantity information provided through step S240 or the default water quantity information provided through step S250. In other words, the water purifier system 1 may actually dispense purified water as much as the water quantity supplied from the water purifier control module 100 (without a separate input from the user).

As another specific example, the water purifier system 1 may display the water quantity information provided through step S240 or S250 on a display device 30 (any display device capable of providing the water quantity information to a user, such as LCD (liquid crystal display) and LED (light emit diode)). In this case, if necessary, the user may change the (estimated) water quantity displayed on the display device 30 by operating input means (e.g., a button) installed in the water purifier system 1. Subsequently, the user may allow the water quantity control device 20 to dispense water as much as the (estimated) water quantity displayed on the display device 30 by operating water dispenser means (e.g., button) installed in the water purifier system 1. Additionally, the water purifier system 1 may detect the amount of dispensed water in the container by using image information acquired through the camera module 10 and control the water quantity control device 20 so as to prevent the detected amount of water from overflowing the container. Alternatively, the user may perform control to stop the operation of dispensing water by operating separate means for stopping dispensing water (e.g., button). According to the user's input as described above, the water purifier system 1 may perform an operation of dispensing water by controlling the water quantity control device 20.

According to the various methods as described above, the actual water quantity may be determined based on at least one or more of the water quantity information provided to the water purifier system or the default water quantity information, control input information input from the user, and system control information for performing control to prevent the amount of dispensed water in a container from overflowing the container.

Next, the processor 120 may receive the actual water quantity information from the water purifier system 1 and update the stored water quantity information in the database 110 with the actual water quantity information, or newly store the actual water quantity information as the water quantity information corresponding to the input data set (S260). In other words, the processor 120 may update (e.g., when existing data is stored in the database) or newly store (e.g., when existing data is not stored in the database) the actual water quantity information about water quantity actually dispensed from the water purifier system 1, as the water quantity information corresponding to the input data set including the user identification information and container identification information identified in step S220.

Through the above method, the water purifier control module according to the inventive concept may provide customized services for each user and container. In addition, the water purifier control module according to the inventive concept may provide a more adaptive customized service by updating water quantity information for each combination of user and container with information on the latest actual water quantity information.

In this case, the camera module 10 according to the inventive concept may be implemented in various ways according to embodiments as described below.

Figure 4A:
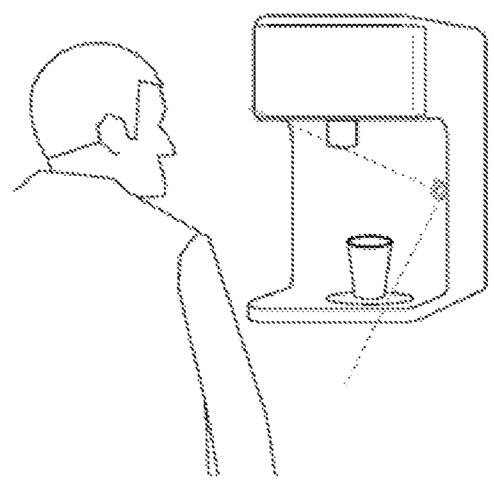
FIGS. 4A and 4B are diagrams schematically showing an example of a water purifier system applicable to the inventive concept.
Figure 4B:
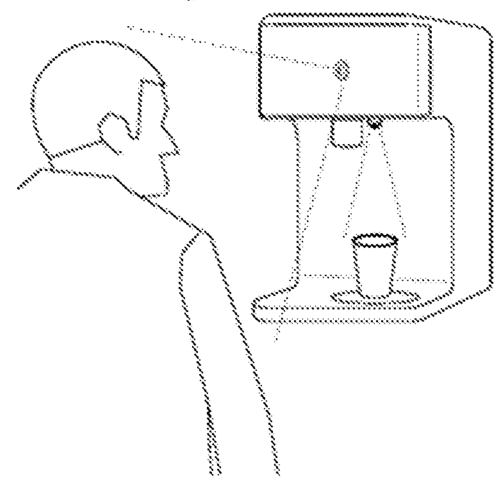

FIGS. 4A and 4B are diagrams schematically showing an example of a water purifier system applicable to the inventive concept.

As shown in FIG. 4A, the camera module 10 may include a single camera device installed in the water purifier system 1 to simultaneously capture a user and a container. In other words, image information acquired by the processor 120 from the camera module 10 may be acquired from the single camera device installed to simultaneously capture the user and the container.

As another example, as shown in FIG. 4B, the camera module 10 may include a first camera device installed in the water purifier system 1 to face a user and a second camera device installed in the water purifier system 1 so as to have a predetermined angle with the downward direction of the water outlet of the water purifier system 1. In other words, the image information acquired by the processor 120 from the camera module 10 may include first image information acquired from the first camera device installed in the water purifier system 1 to capture the user, and second image information acquired from a second camera device installed in the water purifier system 1 to capture the container. In this case, as described above, the second camera device may be installed in the water purifier system 1 so as to have the predetermined angle with the downward direction of the water outlet of the water purifier system 1. In this case, the predetermined angle may include various angles such as 30 degrees, 45 degrees, and 60 degrees. In particular, in the inventive concept, the predetermined angle may be set to have a fixed value or set to have different values according to user or system control.

As another example applicable to the inventive concept, the water purifier control module may provide a customized service by additionally using not only user identification information and container identification information but also preset information provided from the user. To this end, the processor 120 may additionally receive preset information from a user, and an input data set for identifying the water quantity information stored in the database 110 may include the preset information together with the user identification information and the container identification information.

It is assumed that the user approaches the water purifier system 1 while holding a container (e.g., cup, bowl, etc.), places the container under the water outlet of the water purifier system 1, and inputs specific preset information through separate preset selection means (e.g., a certain number of buttons) installed in the water purifier system 1 to dispense water in a pattern suitable for the user itself. In this case, the water purifier control module 100 may determine whether related water quantity information is stored in the database 110 by using the preset information input together with the user identification information and container identification information acquired through step S220, and provide stored water quantity information or default water quantity information to the water purifier system 1 depending on whether or not the related water quantity information is stored.

Through this, the user may set a plurality of pieces of preset information (e.g., pattern model, etc.) for the same container, and the water purifier system may provide a water dispensing pattern suitable for the user's preference.

FIG. 5 is a schematic diagram showing a water purifier system according to the inventive concept.

As shown in FIG. 5, a water purifier system 500 according to the inventive concept may include a database 510, a camera module 520, a water quantity control device 530, and a processor 540. According to an embodiment, the water purifier system 500 may further include a display device 550.

The water purifier system 500 shown in FIG. 5 is an entire system including the water purifier control module 100 described above and may provide a user-customized service. Through this, the processor 540 may be connected to the database 510, the camera module 520, and the water quantity control device 530 to control the operation of the water purifier system 500 according to the above-described water purifier control method.

Additionally, the computer program according to the inventive concept may be stored in a computer readable recording medium in order to execute the above-described water purifier control method in combination with a computer.

The above-described program may include codes coded in a computer language, such as C, C++, JAVA, or a machine language, which are readable by a processor (CPU) of the computer through a device interface of the computer such that the computer reads the program and execute the methods implemented by the program. The codes may include functional codes associated with a function defining functions necessary to execute the methods or the like, and include control codes associated with an execution procedure necessary for the processor of the computer to execute the functions according to a predetermined procedure. In addition, the codes may further include memory reference codes indicating at which location (address number) of the computer's internal or external memory, additional information or media required for the computer's processor to execute the functions can be referenced. In addition, when the processor of the computer needs to communicate with any other computer or server located remotely to execute the above functions, codes may further include communication-related codes for how to communicate with any other remote computer or server using a communication module of the computer, and what information or media to transmit/receive during communication.

The steps of a method or algorithm described in connection with the embodiments of the present disclosure may be implemented directly in hardware, in a software module executed by hardware, or in a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or in a computer readable recording medium that is well known in the art.

Although embodiments of the present disclosure have been described above with reference to the accompanying drawings, it is understood that those skilled in the art to which the present disclosure pertains may implement the present disclosure in other specific forms without changing the technical spirit or essential features thereof. Therefore, it should be understood that the embodiments described above are illustrative in all respects and not restrictive.

According to the inventive concept, a user can receive user-customized services according to a container (for example, a cup) that the user intends to use.

Accordingly, the user can receive customized services for a specific user even though the water purifier system is available by multiple users.

However, effects of the inventive concept may not be limited to the above-described effects. Although not described herein, other effects of the inventive concept can be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A water purifier control module comprising:

a database configured to store water quantity information identified based on a data set including user information and container information; and a processor connected to the database to control an operation of a water purifier system, wherein the processor is configured to:

acquire captured image information from a camera module installed in the water purifier system to capture a user and a container located under a water outlet;

acquire user identification information corresponding to the user and container identification information corresponding to the container from the image information;

determine whether water quantity information corresponding to an input data set including the acquired user identification information and container identification information is stored in the database;

provide the stored water quantity information to the water purifier system, in response to determining that the water quantity information corresponding to the input data set is stored in the database;

provide default water quantity information corresponding to the container identification information to the water purifier system, in response to determining that the water quantity information corresponding to the input data set is not stored in the database;

control the water outlet to dispense purified water into the container, based on the stored water quantity information or the default water quantity information;

detect an amount of purified water in the container by using image information acquired through the camera module;

control the water outlet to prevent the detected amount of purified water from overflowing the container;

receive actual dispensed water quantity information, and update the stored water quantity information in the database with the actual dispensed water quantity information or newly store the actual dispensed water quantity information as the water quantity information corresponding to the input data set; and control the water outlet to dispense purified water into the container, based on the updated water quantity information or the newly stored water quantity information.

2. The water purifier control module of claim 1, wherein the actual water quantity information is determined based on at least one or more of the water quantity information provided to the water purifier system or the default water quantity information, control input information input from the user, and system control information for performing control to prevent the amount of dispensed water in the container from overflowing the container.

3. The water purifier control module of claim 1, wherein the acquired image information is acquired from a single camera device installed in the water purifier system to simultaneously capture the user and the container.

4. The water purifier control module of claim 1, wherein the acquired image information includes:

first image information acquired from a first camera device installed in the water purifier system to capture the user, and second image information acquired from a second camera device installed in the water purifier system to capture the container.

5. The water purifier control module of claim 1, wherein the processor is configured to receive preset information from the user, and wherein the input data set further includes the preset information input from the user.

6. The water purifier control module of claim 1, wherein the processor is configured to control the water outlet to dispense purified water into the container, based on the stored water quantity information or the default water quantity information, without a separate user input regarding water to be dispensing.

7. The water purifier control module of claim 1, wherein the processor is configured to control a display device to display an estimated water quantity based on the stored water quantity information or the default water quantity information, receive a user input to change the estimated water quantity, and control the water outlet to dispense purified water based on the user input.

8. A water purifier system comprising:

a database configured to store water quantity information identified based on a data set including user information and container information;

a camera module installed to capture a user and a container located under a water outlet;

a water quantity control device configured to control a water quantity; and a processor connected to the database, the camera module, and the water quantity control device to control an operation of the water purifier system including the water quantity control device, wherein the processor is configured to:

acquire captured image information from the camera module;

acquire user identification information corresponding to the user and container identification information corresponding to the container from the image information;

determine whether water quantity information corresponding to an input data set including the acquired user identification information and container identification information is stored in the database;

control the water quantity control device based on the stored water quantity information, in response to determining that the water quantity information corresponding to the input data set is stored in the database;

control the water quantity control device based on default water quantity information corresponding to the container identification information, in response to determining that the water quantity information corresponding to the input data set is not stored in the database;

control the water outlet to dispense purified water into the container, based on the stored water quantity information or the default water quantity information;

detect an amount of purified water in the container by using image information acquired through the camera module;

control the water outlet to prevent the detected amount of purified water from overflowing the container:

acquire actual dispensed water quantity information of the water quantity control device, and update the stored water quantity information in the database with the actual dispensed water quantity information or newly store the actual water quantity information as the water quantity information corresponding to the input data set; and control the water outlet to dispense purified water into the container, based on the updated water quantity information or the newly stored water quantity information.

9. The water purifier system of claim 8, wherein the camera module includes a single camera device installed in the water purifier system to simultaneously capture the user and the container.

10. The water purifier system of claim 8, wherein the camera module includes:

a first camera device installed in the water purifier system to face the user, and a second camera device installed in the water purifier system to have a predetermined angle with a downward direction of the water outlet of the water purifier system.

11. A water purifier control method comprising:

acquiring captured image information from a camera module installed in a water purifier system to capture a user and a container located under a water outlet;

acquiring user identification information corresponding to the user and container identification information corresponding to the container from the image information;

determining whether water quantity information corresponding to an input data set including the acquired user identification information and container identification information is stored in a database;

providing the stored water quantity information to the water purifier system, in response to determining that the water quantity information corresponding to the input data set is stored in the database;

providing default water quantity information corresponding to the container identification information to the water purifier system, in response to determining that the water quantity information corresponding to the input data set is not stored in the database;

controlling the water outlet to dispense purified water into the container, based on the stored water quantity information or the default water quantity information;

detecting an amount of purified water in the container by using image information acquired through the camera module;

controlling the water outlet to prevent the detected amount of purified water from overflowing the container;

receiving actual dispensed water quantity information from the water purifier system, and updating the stored water quantity information in the database with the actual dispensed water quantity information or newly storing the actual water quantity information as the water quantity information corresponding to the input data set; and controlling the water outlet to dispense purified water into the container, based on the updated water quantity information or the newly stored water quantity information.

12. A non-transitory computer-readable recording medium storing a program for executing the water purifier control method of claim 11.

* * * * *